(12) United States Patent
Aoki

(10) Patent No.: US 9,540,511 B2
(45) Date of Patent: Jan. 10, 2017

(54) POLYCARBONATE RESIN COMPOSITION AND MOLDED BODY

(71) Applicant: IDEMITSU KOSAN CO., LTD., Chiyoda-ku (JP)

(72) Inventor: Yusuke Aoki, Taipei (TW)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/770,629

(22) PCT Filed: Mar. 6, 2014

(86) PCT No.: PCT/JP2014/055787
§ 371 (c)(1),
(2) Date: Aug. 26, 2015

(87) PCT Pub. No.: WO2014/136879
PCT Pub. Date: Sep. 12, 2014

(65) Prior Publication Data
US 2016/0009919 A1    Jan. 14, 2016

(30) Foreign Application Priority Data

Mar. 6, 2013 (JP) ................................. 2013-044332

(51) Int. Cl.
| | | |
|---|---|---|
| *C08L 83/06* | (2006.01) | |
| *C08G 64/08* | (2006.01) | |
| *C08K 5/42* | (2006.01) | |
| *C08L 85/00* | (2006.01) | |
| *C08L 83/10* | (2006.01) | |
| C08G 77/448 | (2006.01) | |

(52) U.S. Cl.
CPC ............. *C08L 83/06* (2013.01); *C08G 64/08* (2013.01); *C08K 5/42* (2013.01); *C08L 83/10* (2013.01); *C08L 85/00* (2013.01); C08G 77/448 (2013.01); C08L 2205/025 (2013.01)

(58) Field of Classification Search
CPC ........... C08L 83/06; C08L 85/00; C08L 83/10; C08G 64/08; C08K 5/42
See application file for complete search history.

(56) References Cited

U.S. PATENT DOCUMENTS

| | | | | |
|---|---|---|---|---|
| 5,451,632 A | * | 9/1995 | Okumura ............. | C08G 64/186 524/418 |
| 2005/0085580 A1 | | 4/2005 | Marugan et al. | |
| 2007/0299174 A1 | * | 12/2007 | Chen ....................... | C08L 51/04 524/158 |
| 2011/0245389 A1 | | 10/2011 | Yamada et al. | |
| 2012/0267480 A1 | | 10/2012 | Sybert et al. | |

FOREIGN PATENT DOCUMENTS

| | | |
|---|---|---|
| JP | 8-81620 A | 3/1996 |
| JP | 2719486 B2 | 2/1998 |
| WO | 2012/026236 A1 | 3/2012 |
| WO | 2012/091308 A2 | 7/2012 |
| WO | 2013/051557 A1 | 4/2013 |

OTHER PUBLICATIONS

International Search Report issued on Apr. 15, 2014 for PCT/JP2014/055787 filed on Mar. 6, 2014.
Extended European Search Report issued Sep. 21, 2016 in corr. European Patent App. No. 14759318.9, filed Mar. 6, 2014.

* cited by examiner

*Primary Examiner* — John Uselding
(74) *Attorney, Agent, or Firm* — Oblon, McClelland, Maier & Neustadt, L.L.P.

(57) ABSTRACT

Provided is a polycarbonate resin composition, including: 100 parts by mass of (A) a resin mixture including a specific polycarbonate-polyorganosiloxane copolymer (A-1) and a specific polycarbonate-polyorganosiloxane copolymer (A-2), the component (A) having a content of the siloxane unit in the polycarbonate-polyorganosiloxane copolymer (A-1) of 1.0 mass % to 15.0 mass % and having a content of a siloxane unit in the polycarbonate-polyorganosiloxane copolymer (A-2) of 0.1 mass % to 2.8 mass %; and 0.01 to 0.08 part by mass of (B) at least one kind selected from an alkali metal salt of an organic sulfonic acid and an alkali earth metal salt of an organic sulfonic acid.

12 Claims, No Drawings

POLYCARBONATE RESIN COMPOSITION AND MOLDED BODY

TECHNICAL FIELD

The present invention relates to a polycarbonate resin composition and a molded body obtained by molding the composition.

BACKGROUND ART

A polycarbonate resin has self extinguishability, but in electrical and electronic fields such as OA equipment, information and communication equipment, and household electrical appliances, additionally high flame retardancy is required in some applications. As the polycarbonate resin, there has been known, for example, a flame-retardant resin composition formed of a polycarbonate resin composition using a polycarbonate-polyorganosiloxane (hereinafter referred to as "PC-POS") copolymer and containing a polytetrafluoroethylene having a fibril-forming ability (see, for example, Patent Document 1). However, a molded body molded by using the flame-retardant resin composition involves a problem in that its transparency reduces because the polytetrafluoroethylene is used.

In addition, there has been known a method involving blending a resin composition with an organic alkali metal salt or an organic alkali earth metal salt, and an organosiloxane for improving its flame retardancy without impairing its transparency (see, for example, Patent Document 2).

PRIOR ART DOCUMENTS

Patent Documents

Patent Document 1: Japanese Patent Laid-Open Publication No. 8-81620
Patent Document 2: Japanese Patent Gazette No. 2719486

SUMMARY OF THE INVENTION

Problems to be Solved by the Invention

The resin composition described in Patent Document 2 cannot be said to be a resin composition capable of providing a molded body excellent in all of flame retardancy and impact resistance (in particular, impact resistance at low temperature), and hence the resin composition has been susceptible to further improvement.

In view of the foregoing, an object of the present invention is to provide a polycarbonate resin composition capable of providing a molded body excellent in transparency, flame retardancy, and impact resistance (in particular, impact resistance at low temperature). Another object of the present invention is to provide a molded body excellent in transparency, flame retardancy, and impact resistance (in particular, impact resistance at low temperature).

Means for Solving the Problems

The inventors of the present invention have made extensive investigations, and as a result, have found that the following resin composition can be a resin composition excellent in all of transparency, flame retardancy, and impact resistance (in particular, impact resistance at low temperature): the resin composition uses, out of polycarbonate-polyorganosiloxane copolymers (hereinafter sometimes abbreviated as "PC-POS's", see Japanese Patent Gazette No. 2662310 for the PC-POS's) that are known to be excellent in impact resistance and flame retardancy, a specific combination of PC-POS's at a specific ratio, and is blended with a specific amount of at least one kind selected from an alkali metal salt of an organic sulfonic acid and an alkali earth metal salt of an organic sulfonic acid. Thus, the inventors have completed the present invention.

That is, the present invention relates to the following items [1] to [6].

[1] A polycarbonate resin composition, including: 100 parts by mass of (A) a resin mixture including a polycarbonate-polyorganosiloxane copolymer (A-1) including, in a main chain thereof, a repeating unit represented by the general formula (I) and a repeating unit represented by the general formula (II), wherein n=10 to 68, and a polycarbonate-polyorganosiloxane copolymer (A-2) including, in a main chain thereof, a repeating unit represented by the general formula (I) and a repeating unit represented by the general formula (II), wherein n=72 to 150, the component (A) having a content of the repeating unit represented by the general formula (II) in the polycarbonate-polyorganosiloxane copolymer (A-1) of 1.0 mass % to 15.0 mass % and having a content of the repeating unit represented by the general formula (II) in the polycarbonate-polyorganosiloxane copolymer (A-2) of 0.1 mass % to 2.8 mass %; and 0.01 to 0.08 part by mass of (B) at least one kind selected from an alkali metal salt of an organic sulfonic acid and an alkali earth metal salt of an organic sulfonic acid:

[Chem. 1]

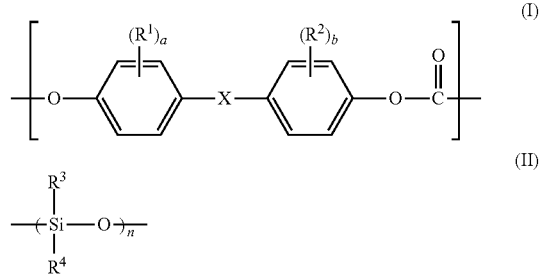

wherein:
$R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkyl group having 7 to 15 carbon atoms, an arylalkylidene group having 7 to 15 carbon atoms, —S—, —SO—, —SO$_2$—, —O—, or —CO—, and a and b each independently represent an integer of 0 to 4; and $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and n represents an average number of repetitions.

[2] The polycarbonate resin composition according to the above-mentioned item [1], in which the component (B) includes at least one kind selected from an alkali metal salt of a perfluoroalkanesulfonic acid and an alkali earth metal salt of a perfluoroalkanesulfonic acid.

[3] The polycarbonate resin composition according to the above-mentioned item [1] or [2], in which a molded body of the polycarbonate resin composition having a thickness of 3 mm has a total light transmittance measured based on ISO 13468 of 85% or more.

[4] The polycarbonate resin composition according to any one of the above-mentioned items [1] to [3], in which a molded body of the polycarbonate resin composition having a thickness of 2 mm is evaluated as V-0 by a UL94 flame test.

[5] The polycarbonate resin composition according to any one of the above-mentioned items [1] to [4], in which the polycarbonate resin composition is free of a bromine-based flame retardant.

[6] A molded body, which is obtained by molding the polycarbonate resin composition of any one of the above-mentioned items [1] to [5].

Effect of the Invention

According to one embodiment of the present invention, it is possible to provide the polycarbonate resin composition capable of providing a molded body excellent in all of transparency, flame retardancy, and impact resistance (in particular, impact resistance at low temperature). According to another embodiment of the present invention, it is possible to provide the molded body, which is obtained by molding the polycarbonate resin composition and is excellent in all of transparency, flame retardancy, and impact resistance (in particular, impact resistance at low temperature).

In particular, a molded article extremely excellent in flame retardancy can be produced from the polycarbonate resin composition according to the embodiment of the present invention because even when a molded body having a thickness of 2 mm is produced from the resin composition and the relatively thin molded body is used, V-0 can be achieved in the evaluation of a UL94 flame test.

MODE FOR CARRYING OUT THE INVENTION

A polycarbonate resin composition of the present invention is a polycarbonate resin composition containing 100 parts by mass of the following specific component (A) and 0.01 to 0.08 part by mass of the following specific component (B).

Now, the components contained in the polycarbonate resin composition of the present invention are described in detail. It should be noted that in this description, a provision considered to be preferred can be arbitrarily adopted and a combination of preferred provisions can be said to be more preferred.

[(A) Resin Mixture]

A resin mixture as the component (A) is (A) a resin mixture containing a polycarbonate-polyorganosiloxane copolymer (A-1) including, in a main chain thereof, a repeating unit represented by the general formula (I) and a repeating unit represented by the general formula (II), wherein n=10 to 68, and a polycarbonate-polyorganosiloxane copolymer (A-2) including, in a main chain thereof, a repeating unit represented by the general formula (I) and a repeating unit represented by the general formula (II), wherein n=72 to 150, the component (A) having a content of the repeating unit represented by the general formula (II) in the polycarbonate-polyorganosiloxane copolymer (A-1) of 1.0 mass % to 15.0 mass % and having a content of the repeating unit represented by the general formula (II) in the polycarbonate-polyorganosiloxane copolymer (A-2) of 0.1 mass % to 2.8 mass %.

One kind of the PC-POS's (A-1) may be used alone, or two or more kinds thereof may be used in combination. Similarly, one kind of the PC-POS's (A-2) may be used alone, or two or more kinds thereof may be used in combination.

[Chem. 2]

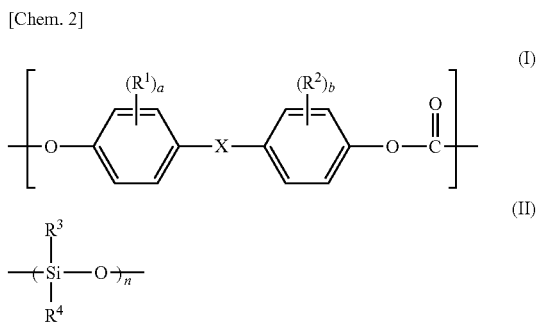

[In the formulae, $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkyl group having 7 to 15 carbon atoms, an arylalkylidene group having 7 to 15 carbon atoms, —S—, —SO—, —SO$_2$—, —O—, or —CO—, and a and b each independently represent an integer of 0 to 4.

$R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and n represents an average number of repetitions.]

Examples of the halogen atom that $R^1$ and $R^2$ in the general formula (I) each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups ("various" means that a linear group and any branched group are included, and the same shall apply hereinafter), various pentyl groups, and various hexyl groups. An example of the alkoxy group that $R^1$ and $R^2$ each independently represent is an alkoxy group whose alkyl group moiety is the alkyl group described above.

$R^1$ and $R^2$ each preferably represent an alkyl group having 1 to 6 carbon atoms or an alkoxy group having 1 to 6 carbon atoms.

Examples of the alkylene group represented by X include a methylene group, an ethylene group, a trimethylene group, a tetramethylene group, and a hexamethylene group, and an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group, and a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group, a cycloalkylidene group having 5 to 10 carbon atoms is preferred, and a cycloalkylidene group having 5 to 8 carbon atoms is more preferred. The arylalkyl group represented by X is a divalent linking group in which an aryl moiety and an alkyl moiety are bonded to each other, and examples of the aryl moiety include aryl groups each having 6 to 14 ring-forming carbon atoms such as a phenyl group, a naphthyl group, a biphenyl group, and an anthryl group. As an aryl moiety of the arylalkylidene group represented by X, there are given, for example, aryl groups each having 6 to 14 ring-forming carbon atoms such as a phenyl group, a naphthyl group, a biphenyl group, and an anthryl group.

a and b each independently represent an integer of 0 to 4, preferably from 0 to 2, more preferably 0 or 1.

Examples of the halogen atom that $R^3$ and $R^4$ in the general formula (II) each independently represent include a fluorine atom, a chlorine atom, a bromine atom, and an iodine atom. Examples of the alkyl group or alkoxy group that $R^3$ and $R^4$ each independently represent include the same examples as those in the case of $R^1$ and $R^2$. Examples of the aryl group that $R^3$ and $R^4$ each independently represent include a phenyl group and a naphthyl group.

It should be noted that $R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

As described later, the component (A) may contain, as a component (A-3), a polycarbonate-based resin that does not correspond to any one of the component (A-1) and the component (A-2).

Here, the blending ratios of the component (A-1) and the component (A-2) only need to be adjusted so that in the resin mixture, the content of the unit represented by the general formula (II) in the polycarbonate-polyorganosiloxane copolymer (A-1) may be from 1.0 mass % to 15.0 mass %, and the content of the unit represented by the general formula (II) in the polycarbonate-polyorganosiloxane copolymer (A-2) may be from 0.1 mass % to 2.8 mass % as described below. For example, when the polycarbonate-based resin (A-3) that does not correspond to any one of the component (A-1) and the component (A-2) may be contained in the resin mixture, the ratio of the component (A-1) in the resin mixture can be preferably, for example, from 40 mass % to 95 mass %, from 45 mass % to 93 mass %, or from 50 mass % to 91 mass %, and the ratio of the component (A-2) in the resin mixture can be preferably, for example, from 5 mass % to 40 mass %, from 7 mass % to 37 mass %, or from 9 mass % to 34 mass %.

In addition, for example, when the polycarbonate-based resin (A-3) that does not correspond to any one of the component (A-1) and the component (A-2) is not contained in the resin mixture, the ratio of the component (A-1) in the resin mixture can be preferably, for example, from 60 mass % to 95 mass %, from 63 mass % to 93 mass %, or from 66 mass % to 91 mass %, and the ratio of the component (A-2) in the resin mixture can be preferably, for example, from 5 mass % to 40 mass %, from 7 mass % to 37 mass %, or from 9 mass % to 34 mass %.

A structure containing a repeating unit represented by the general formula (II) is preferably a structure represented by the following general formula (II').

[Chem. 3]

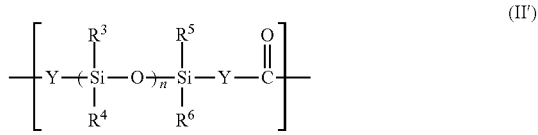

In the formula (II'), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue containing an aliphatic or aromatic moiety, and n represents an average number of repetitions.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms. Y preferably represents a residue of a phenol-based compound having an alkyl group, and more preferably represents an organic residue derived from allylphenol or an organic residue derived from eugenol.

In addition, the structure containing a repeating unit represented by the general formula (II) is preferably the following formula (II").

[Chem. 4]

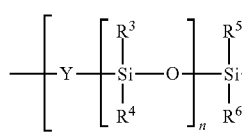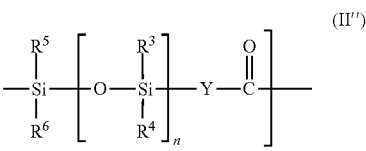

In the formula (II"), $R^3$ to $R^6$, Y, and n are identical to those in the general formula (II'), and preferred ones thereof are also the same as those in the formula.

m represents 0 or 1.

Z represents a halogen, —$R^7$OH, —$R^7$COOH, —$R^7$NH$_2$, —COOH, or —SH as in Z in the general formula (2) that appears later, and the $R^7$ represents a linear, branched, or cyclic alkylene group, an aryl-substituted alkylene group, an aryl-substituted alkylene group that may have an alkoxy group on a ring thereof, or an arylene group.

In addition, β represents a divalent group derived from a diisocyanate compound. Specific examples of the divalent group derived from a diisocyanate compound are described later.

In the PC-POS (A-1), the average number of repetitions (n) in the constituent unit represented by the general formula (II) is from 10 to 68, preferably from 20 to 65, more preferably from 25 to 60, still more preferably from 30 to 55.

Meanwhile, in the PC-POS (A-2), the average number of repetitions (n) in the constituent unit represented by the general formula (II) is from 72 to 150, preferably from 75 to 140, more preferably from 78 to 130, still more preferably from 80 to 120. A lower limit for the average number of repetitions (n) is set from the viewpoints of flame retardancy and impact resistance, and an upper limit therefor is set from the viewpoint of transparency.

A value for the average number of repetitions (n) is a value calculated by nuclear magnetic resonance (NMR) measurement.

All of the transparency, the flame retardancy, and the impact resistance (in particular, impact resistance at low temperature) can be made excellent by using such specific PC-POS (A-1) and such specific PC-POS (A-2), and mixing a predetermined amount of the component (B) to be described later.

The PC-POS (A-1) and PC-POS (A-2) each have a viscosity-average molecular weight (Mv) of preferably from 14,000 to 28,000, more preferably from 15,000 to 26,000, still more preferably from 16,000 to 24,000, particularly preferably from 16,000 to 22,000. As long as the viscosity-average molecular weight of the PC-POS falls within the range, the impact resistance of a molded body thereof becomes sufficient, the viscosity of the PC-POS does not become excessively large and productivity at the time of its production becomes stable, and the PC-POS can be easily molded into a thin body.

It should be noted that the viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C.

In the present invention, from the viewpoint of improving all of the transparency, the flame retardancy, and the impact resistance (in particular, impact resistance at low temperature), in the component (A), the content of the repeating unit containing a structure represented by the general formula (II) in the PC-POS (A-1) is set to from 1.0 mass % to 15.0 mass %, and the content of the repeating unit containing a structure represented by the general formula (II) in the PC-POS (A-2) is set to from OA mass % to 2.8 mass %. It should be noted that in detail, lower limits for the contents of the repeating units each containing a structure represented by the general formula (II) are set to the above-mentioned values from the viewpoints of the flame retardancy and the impact resistance, and upper limits therefor are set to the above-mentioned values from the viewpoints of heat resistance and the transparency.

From the same viewpoints, in the component (A), the content of the repeating unit containing a structure represented by the general formula (II) in the PC-POS (A-1) is preferably from 1.0 mass % to 10.0 mass %, more preferably from 1.5 mass % to 8.0 mass %, sill more preferably from 2.0 mass % to 7.0 mass %, yet still more preferably from 2.0 mass % to 6.5 mass %, particularly preferably from 2.5 mass % to 6.0 mass %.

In addition, from the same viewpoints, in the component (A), the content of the repeating unit containing a structure represented by the general formula (II) in the PC-POS (A-2) is preferably from 0.1 mass % to 2.5 mass %, more preferably from 0.1 mass % to 2.3 mass %, still more preferably from 0.3 mass % to 2.3 mass %, particularly preferably from 0.5 mass % to 2.1 mass %.

Here, the content of the constituent unit in each PC-POS is a value calculated by nuclear magnetic resonance (NMR) measurement.

A method of producing each of the PC-POS (A-1) and the PC-POS (A-2) is not particularly limited, and each of the PC-POS's can be easily produced with reference to a known production method for a PC-POS such as a method described in JP 2010-241943 A.

Specifically, each of the PC-POS's can be produced by: dissolving an aromatic polycarbonate oligomer produced in advance and a polyorganosiloxane having a reactive group at a terminal thereof in a water-insoluble organic solvent (such as methylene chloride); adding an aqueous alkaline compound solution (such as aqueous sodium hydroxide) of a dihydric phenol-based compound (such as bisphenol A) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a terminal stopper (a monohydric phenol such as p-t-butylphenol). It should be noted that the contents of the repeating units each containing a structure represented by the general formula (II) can be adjusted to fall within the ranges by, for example, adjusting the usage amount of the polyorganosiloxane.

After the interfacial polycondensation reaction, the resultant is appropriately left at rest to be separated into an aqueous phase and a water-insoluble organic solvent phase [separating step], the water-insoluble organic solvent phase is washed (preferably washed with a basic aqueous solution, an acidic aqueous solution, and water in the stated order) [washing step], and the resultant organic phase is concentrated [concentrating step], pulverized [pulverizing step], and dried [drying step]. Thus, the PC-POS can be obtained.

In addition, the PC-POS can be produced by copolymerizing a dihydric phenol represented by the following general formula (1), a polyorganosiloxane represented by the following general formula (2), and phosgene, a carbonate, or a chloroformate.

[Chem. 5]

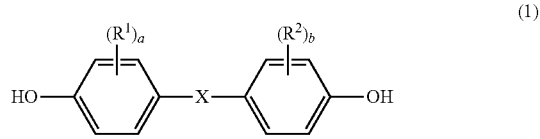

(1)

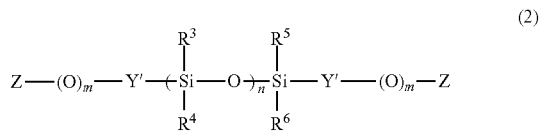

(2)

Here, in the general formula (1), $R^1$ and $R^2$, X, a, and b are the same as those in the general formula (I), and in the general formula (2), $R^3$ to $R^6$ are the same as those in the general formula (II'), n is the same as that in the general formula (II), and Y' is the same as Y in the general formula (II').

m represents 0 or 1, Z represents a halogen, —$R^7$OH, —$R^7$COOH, —$R^7$NH$_2$, —COOH, or —SH, and $R^7$ represents a linear, branched, or cyclic alkylene group, an aryl-substituted alkylene group, an aryl-substituted alkylene group that may have an alkoxy group on a ring thereof, or an arylene group.

Y' preferably represents a single bond, or an organic residue including an aliphatic moiety or an aromatic moiety, the organic residue being bonded to Si and O or to Si and Z.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms. n is the same as that in the foregoing, and m represents 0 or 1.

Z preferably represents —$R^7$OH, —$R^7$COOH, —$R^7$NH$_2$, —COOH, or —SH. The $R^7$ is the same as that in the foregoing and represents a linear, branched, or cyclic alkylene group, an aryl-substituted alkylene group, an aryl-substituted alkylene group that may have an alkoxy group on a ring thereof, or an arylene group.

The dihydric phenol represented by the general formula (1) as a raw material for the PC-POS is not particularly limited, but is suitably 2,2-bis(4-hydroxyphenyl)propane [trivial name: bisphenol A]. When bisphenol A is used as the dihydric phenol, in the resultant PC-POS, X represents an isopropylidene group and a=b=0 in the general formula (I).

Examples of the dihydric phenol except bisphenol A include: bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as bis(4-hydroxyphenyl)diphenylmethane, 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

One kind of those dihydric phenols may be used alone, or two or more kinds thereof may be used as a mixture.

The polyorganosiloxane represented by the general formula (2) can be easily produced by subjecting a phenol having an olefinically unsaturated carbon-carbon bond (preferably vinylphenol, allylphenol, eugenol, isopropenylphenol, or the like), to a hydrosilanation reaction with a terminal of a polyorganosiloxane chain having a predetermined polymerization degree (n; number of repetitions). The phenol is more preferably allylphenol or eugenol.

The polyorganosiloxane represented by the general formula (2) is preferably one in which $R^3$ to $R^6$ each represent a methyl group.

Examples of the polyorganosiloxane represented by the general formula (2) include compounds represented by the following general formulae (2-1) to (2-9).

[Chem. 6]

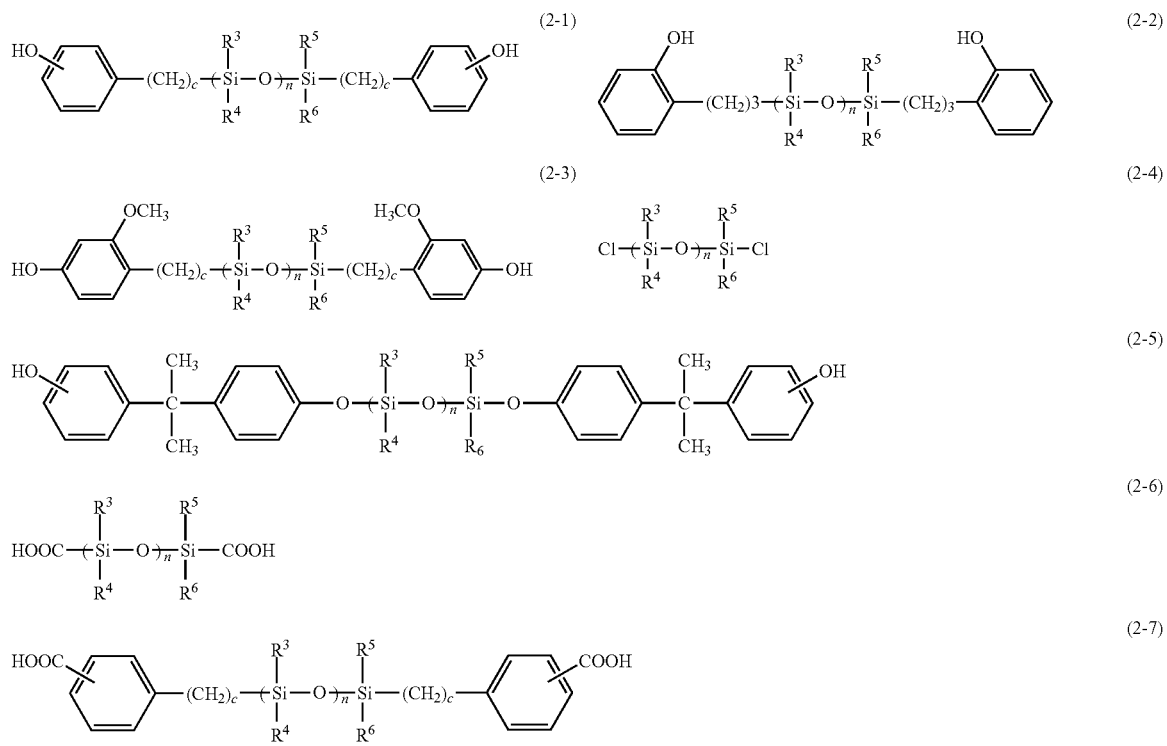

-continued

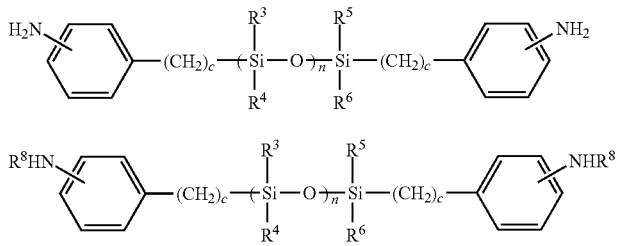

(2-8)

(2-9)

In the general formulae (2-1) to (2-9), $R^3$ to $R^6$, and n are as defined in the foregoing, and preferred ones thereof are also the same as those in the foregoing. In addition, $R^8$ represents an alkyl group, an alkenyl group, an aryl group, or an aralkyl group, and c represents a positive integer and typically represents an integer of 1 to 6.

In addition, $R^8$ preferably represents an alkyl group, an alkenyl group, an aryl group, or an aralkyl group.

Among them, a phenol-modified polyorganosiloxane represented by the general formula (2-1) is preferred from the viewpoint of its ease of polymerization. In addition, an α,ω-bis[3-(o-hydroxyphenyl)propyl]polydimethylsiloxane as one kind of compound represented by the general formula (2-2) or an α,ω-bis[3-(4-hydroxy-2-methoxyphenyl)propyl]polydimethylsiloxane as one kind of compound represented by the general formula (2-3) is preferred from the viewpoint of its ease of availability.

The phenol-modified polyorganosiloxane can be produced by a known method. For example, the following method is given as the production method.

First, cyclotrisiloxane and disiloxane are caused to react with each other in the presence of an acid catalyst to synthesize an α,ω-dihydrogen organopolysiloxane. At this time, an α,ω-dihydrogen organopolysiloxane having a desired average repeating unit can be synthesized by changing a blending ratio between cyclotrisiloxane and disiloxane. Next, the α,ω-dihydrogen organopolysiloxane is subjected to an addition reaction with a phenol compound having an unsaturated aliphatic hydrocarbon group such as allylphenol or eugenol in the presence of a catalyst for a hydrosilylation reaction, whereby a phenol-modified polyorganosiloxane having a desired average repeating unit can be produced.

In addition, at this stage, a cyclic polyorganosiloxane having a low molecular weight and an excessive amount of the phenol compound remain as impurities. Accordingly, those low-molecular weight compounds are preferably removed by distillation with heating under reduced pressure.

Further, the PC-POS may be a copolymer produced by copolymerizing the dihydric phenol represented by the general formula (1), a polyorganosiloxane represented by the following general formula (3), and phosgene, a carbonate, or a chloroformate. The general formula (3) represents a product of a reaction between the polyorganosiloxane represented by the general formula (2) and a diisocyanate compound.

[Chem. 7]

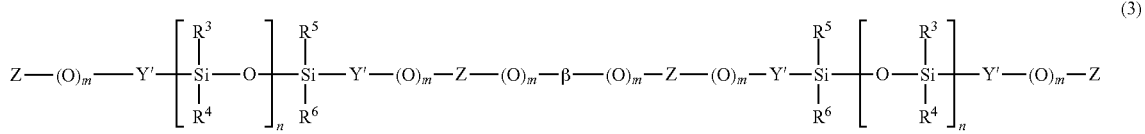

(3)

In the general formula (3), $R^3$ to $R^6$, n, m, Y', and Z are as defined in the foregoing, and preferred ones thereof are also the same as those in the foregoing.

In addition, B represents a divalent group derived from the diisocyanate compound, and examples thereof include divalent groups represented by the following general formulae (3-1) to (3-4).

[Chem. 8]

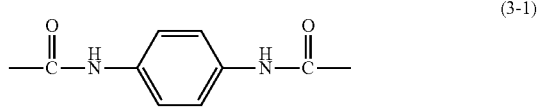

(3-1)

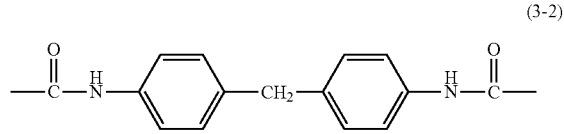

(3-2)

(3-3)

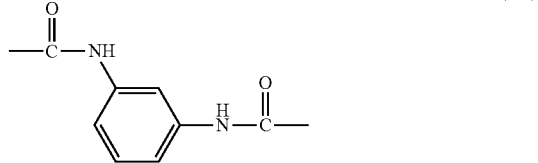

(3-4)

As described in the foregoing, the polycarbonate-based resin (A-3) except the component (A-1) and the component (A-2) may be contained in the component (A) to the extent that the effects of the present invention are not impaired. The component (A-3) may be an aromatic polycarbonate resin obtained by using an aromatic dihydric phenol-based compound, may be an aliphatic polycarbonate resin obtained by using an aliphatic dihydric phenol-based compound, may be an aliphatic polycarbonate resin obtained by using an aliphatic divalent hydroxyl group-containing compound, or may be an aromatic-aliphatic polycarbonate resin obtained by using the aromatic dihydric phenol-based compound and the aliphatic dihydric phenol-based compound in combination. The component (A-3) can be used for adjusting the contents of the repeating units each containing a structure represented by the general formula (II) in the resin mixture (A).

Among them, an aromatic polycarbonate resin is preferred as the component (A-3).

The viscosity-average molecular weight of the polycarbonate-based resin as the component (A-3) is preferably from 10,000 to 40,000, more preferably from 13,000 to 30,000 in terms of physical properties.

The aromatic polycarbonate resin is preferably as follows: the resin is free of a repeating unit containing a structure represented by the general formula (II) and its main chain is formed of a repeating unit represented by the following general formula (III). Such aromatic polycarbonate resin is not particularly limited, and any one of the various known aromatic polycarbonate resins can be used.

[Chem. 1]

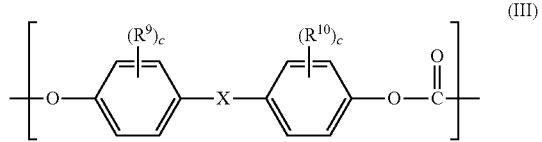

(III)

[In the formula, $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and c and d each independently represent an integer of 0 to 4.]

Specific examples of $R^9$ and $R^{10}$ include the same examples as those of $R^1$ and $R^2$, and preferred ones thereof are also the same as those of $R^1$ and $R^2$. $R^9$ and $R^{10}$ each more preferably represent an alkyl group having 1 to 6 carbon atoms or an alkoxy group having 1 to 6 carbon atoms. Specific examples of X' include the same examples as those of X, and preferred ones thereof are also the same as those of X. c and d each independently represent preferably from 0 to 2, more preferably 0 or 1.

Specifically, a resin obtained by a conventional production method for an aromatic polycarbonate can be used as the aromatic polycarbonate resin. Examples of the conventional method include: an interfacial polymerization method involving causing the aromatic dihydric phenol-based compound and phosgene to react with each other in the presence of an organic solvent inert to the reaction and an aqueous alkaline solution, adding a polymerization catalyst such as a tertiary amine or a quaternary ammonium salt to the resultant, and polymerizing the mixture; and a pyridine method involving dissolving the aromatic dihydric phenol-based compound in pyridine or a mixed solution of pyridine and an inert solvent, and introducing phosgene to the solution to directly produce the resin.

A molecular weight modifier (terminal stopper), a branching agent, or the like is used as required at the time of the reaction.

It should be noted that the aromatic dihydric phenol-based compound is, for example, a compound represented by the following general formula (III ').

[Chem. 10]

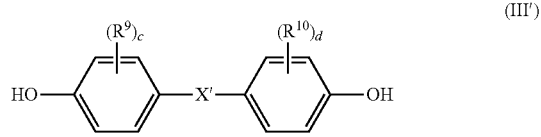

(III')

[In the formula, $R^9$, $R^{10}$, and X' are as defined in the foregoing, and preferred ones thereof are also the same as those in the foregoing.]

Specific examples of the aromatic dihydric phenol-based compound include bis(hydroxyphenyl)alkali-based dihydric phenols such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane, 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis (4-hydroxyphenyl) sulfoxide, and bis(4-hydroxyphenyl) ketone.

Among them, bis(hydroxyphenyl)alkane-based dihydric phenols are preferred, and bisphenol A is more preferred.

One kind of the aromatic polycarbonate resins may be used alone, or two or more kinds thereof may be used in combination.

In addition, the aliphatic polycarbonate resin can be produced by using the aliphatic divalent hydroxyl group-containing compound or the aliphatic dihydric phenol-based compound instead of the aromatic dihydric phenol-based compound.

It should be noted that the aromatic-aliphatic polycarbonate resin can be produced by using the aromatic dihydric phenol-based compound and the aliphatic dihydric phenol-based compound in combination as described in the foregoing.

When the polycarbonate-based resin (A-3) except the component (A-1) and the component (A-2) is incorporated into the polycarbonate resin composition, its content, which is not particularly limited, is preferably 40 mass % or less, more preferably 30 mass % or less, still more preferably 20 mass % or less, particularly preferably 10 mass % or less in the component (A) in normal cases.

[(B) Alkali Metal Salt of Organic Sulfonic Acid and/or Alkali Earth Metal Salt of Organic Sulfonic Acid]

In the present invention, in order to improve the flame retardancy, as a component (B), at least one kind selected from an alkali metal salt of an organic sulfonic acid and an alkali earth metal salt of an organic sulfonic acid (hereinafter sometimes collectively referred to as organic sulfonic acid alkali (earth) metal salt) is blended in a specific amount.

Examples of the organic sulfonic acid include a perfluoroalkanesulfonic acid and a polystyrenesulfonic acid.

In addition, examples of the alkali metal salt include a sodium salt, a potassium salt, a lithium salt, and a cesium salt. Examples of the alkali earth metal salt include a magnesium salt, a calcium salt, a strontium salt, and a barium salt.

The organic sulfonic acid alkali (earth) metal salt is preferably at least one kind selected from an organic sulfonic acid sodium salt, an organic sulfonic acid potassium salt, and an organic sulfonic acid cesium salt.

The component (B) is preferably at least one kind selected from a perfluoroalkanesulfonic acid alkali metal salt or alkali earth metal salt, and an alkali metal salt or alkali earth metal salt of polystyrenesulfonic acid.

An example of the perfluoroalkanesulfonic acid alkali (earth) metal salt is a salt represented by the following general formula (12).
[Chem. 11]

$$(C_dF_{2d+1}SO_3)_eM \qquad (12)$$

(In the formula, d represents an integer of 1 to 10, M represents an alkali metal such as lithium, sodium, potassium, or cesium, or an alkali earth metal such as magnesium, calcium, strontium, or barium, and e represents the valence of M.)

For example, salts described in JP 47-40445 B correspond to those metal salts.

Examples of the perfluoroalkanesulfonic acid in the general formula (12) may include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, and perfluorooctanesulfonic acid. In particular, a potassium salt of any such perfluoroalkanesulfonic acid is preferably used.

In addition, in the polycarbonate resin composition of the present invention, an organic sulfonic acid alkali (earth) metal salt other than the perfluoroalkanesulfonic acid alkali (earth) metal salt may also be used. Examples of such organic sulfonic acid alkali (earth) metal salt include alkali (earth) metal salts of organic sulfonic acids such as an alkylsulfonic acid, benzenesulfonic acid, an alkylbenzenesulfonic acid, diphenylsulfonic acid, naphthalenesulfonic acid, 2,5-dichlorobenzenesulfonic acid, 2,4,5-trichlorobenzenesulfonic acid, diphenyl sulfone-3-sulfonic acid, diphenyl sulfone-3,3'-disulfonic acid, and naphthalenetrisulfonic acid, and fluorine-substituted products thereof. Among them, an alkali (earth) metal salt of diphenylsulfonic acid is preferred comparably to the alkali (earth) metal salt of the perfluoroalkanesulfonic acid.

In addition, the alkali (earth) metal salt of the polystyrene sulfonic acid is, for example, an alkali (earth) metal salt of a sulfonate group-containing aromatic vinyl resin represented by the following general formula (13).

[Chem. 12]

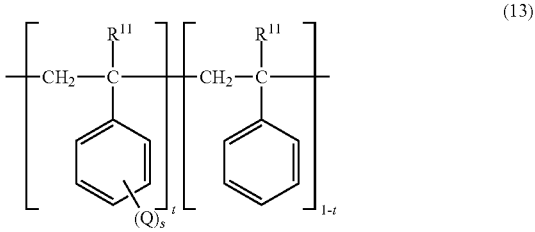

(13)

(In the formula (13), Q represents a sulfonate group, $R^{11}$ represents a hydrogen atom or a hydrocarbon group having 1 to 10 carbon atoms, s represents an integer of 1 to 5, and t represents a molar fraction and satisfies a relationship of $0 < t \leq 1$.)

In this case, the sulfonate group Q is an alkali metal salt and/or alkali earth metal salt of a sulfonic acid, and examples of the metals include sodium, potassium, lithium, rubidium, cesium, beryllium, magnesium, calcium, strontium, and barium.

In addition, $R^{11}$ represents a hydrogen atom or a hydrocarbon group having 1 to 10 carbon atoms, preferably a hydrogen atom or a methyl group.

s represents an integer of 1 to 5 and t satisfies a relationship of $0 < t \leq 1$. Therefore, the alkali (earth) metal salt of the polystyrene sulfonic acid may contain an aromatic ring that is totally substituted or partially substituted with the sulfonate group Q.

The content of the alkali (earth) metal salt of the organic sulfonic acid is from 0.01 part by mass to 0.08 part by mass, preferably from 0.02 part by mass to 0.07 part by mass, more preferably from 0.03 part by mass to 0.06 part by mass with respect to 100 parts by mass of the resin mixture (A). It is preferred that the content fall within the range because the flame retardancy can be sufficiently improved. When the content is 0.01 part by mass or more with respect to 100 parts by mass of (A) the resin mixture, the composition is excellent in flame retardancy, and when the content is 0.08 part by mass or less, the composition can maintain its transparency.

[Other Component]

Any other component can be appropriately incorporated into the polycarbonate resin composition of the present invention to the extent that the effects of the present invention are not remarkably impaired.

Examples of the other component include additives such as a thermoplastic resin except the component (A-1) to the component (A-3), a reinforcing agent, a filler, an antioxidant, an antistatic agent, a benzotriazole- or benzophenone-based UV absorber, a hindered amine-based light stabilizer (weathering agent), a lubricant, a release agent, an antimicrobial agent, a compatibilizer, a colorant (a dye or a pigment), a flame retardant, and an impact modifier.

Here, the other component is preferably free of a halogen. For example, the polycarbonate resin composition of the present invention is preferably substantially free of a halogen-based flame retardant, especially a bromine-based flame retardant. This is because the composition is desirably free of a halogen from the viewpoints of safety and an influence on an environment at the time of its disposal or incineration. The polycarbonate resin composition of the present invention is advantageous in that the composition has high flame retardancy even when the halogen-based flame retardant, especially the bromine-based flame retardant is not incorporated into the composition.

When the other components are incorporated into the polycarbonate resin composition, their contents, which are not particularly limited, are each preferably 10 parts by mass or less, more preferably 5 parts by mass or less, still more preferably 1 part by mass or less, particularly preferably 0.5 part by mass or less with respect to 100 parts by mass of the component (A) in normal cases.

[Kneading and Molding]

The polycarbonate resin composition of the present invention is obtained by kneading predetermined amounts of the component (A) and the component (B), and as required, any other component. A method for the kneading is not particularly limited and examples thereof include methods involving using a ribbon blender, a Henschel mixer, a Banbury mixer, a drum tumbler, a single-screw extruder, a twin-screw extruder, a co-kneader, and a multi-screw extruder. In general, a heating temperature during the kneading is preferably from 240° C. to 330° C., more preferably from 250° C. to 320° C.

Various conventionally known molding methods such as an injection molding method, an injection compression molding method, an extrusion molding method, a blow molding method, a press molding method, a vacuum molding method, and an expansion molding method can be employed for the molding.

It should be noted that a component to be incorporated except the polycarbonate resin can be melted and kneaded with the polycarbonate resin or any other thermoplastic resin in advance, i.e., can be added as a master batch.

In addition, the polycarbonate resin composition is preferably pelletized and then injection-molded. A general injection molding method or a general injection compression molding method, or a special molding method such as a gas-assisted molding method can be employed for the injection molding. Thus, various molded bodies can be produced.

When the molded body of the present invention is used as an external appearance member, a molding technology for improving an external appearance such as a heat cycle molding method, a high-temperature mold, or an insulated runner mold is preferably employed.

In addition, when a part is required to be made flame-retardant, a molding technology such as laminate molding or two-color molding with a resin material having flame retardancy is preferably employed.

Insert molding or outsert molding becomes an effective method when a molding machine has a high-temperature heat source because performing the insert molding or outsert molding of a metal part can improve the efficiency of heat transfer from the heat source.

In order to obtain a large and thin injection-molded body, injection compression molding, or high-pressure or ultra-high-pressure injection molding is preferably employed, and partial compression molding or the like can be employed in the molding of a molded body having a partial thin portion.

When the polycarbonate resin composition of the present invention thus obtained is molded into a molded body having a thickness of 3 mm, its total light transmittance measured based on ISO 13468 is preferably 85% or more. The total light transmittance is preferably as high as possible, but an upper limit for the total light transmittance can be, for example, 92%, 91%, or 90% from the viewpoint of, for example, ease of production. Therefore, the total light transmittance can be, for example, 85% or more and 92% or less, 85% or more and 91% or less, or 85% or more and 90% or less.

A haze measured in accordance with a method described in Examples is 2.0 or less, preferably 1.8 or less, more preferably 1.6 or less. The haze is preferably as low as possible, but a lower limit therefor can be, for example, 0.3, 0.5, 0.7, or 0.8 from the viewpoint of ease of production. Therefore, the haze can be, for example, 0.3 or more and 1.8 or less, 0.5 or more and 1.8 or less, 0.7 or more and 1.8 or less, 0.8 or more and 1.8 or less, 0.3 or more and 1.6 or less, 0.5 or more and 1.6 or less, 0.7 or more and 1.6 or less, or 0.8 or more and 1.6 or less.

In addition, the IZOD impact strength of the composition at 23° C. measured in accordance with a method described in Examples is preferably 700 J/m$^2$ or more, more preferably 730 J/m$^2$ or more, still more preferably 740 J/m$^2$ or more. The IZOD impact strength at 23° C. is preferably as high as possible, but an upper limit therefor can be, for example, 850 J/m$^2$ or 820 J/m$^2$ from the viewpoint of the ease of production. Therefore, the IZOD impact strength at 23° C. measured in accordance with the method described in Examples can be, for example, 700 J/m$^2$ or more and 850 J/m$^2$ or less, 730 J/m$^2$ or more and 850 J/m$^2$ or less, 740 J/m$^2$ or more and 850 J/m$^2$ or less, 700 J/m$^2$ or more and 820 J/m$^2$ or less, 730 J/m$^2$ or more and 820 J/m$^2$ or less, or 740 J/m$^2$ or more and 820 J/m$^2$ or less.

The IZOD impact strength at −30° C. measured in accordance with the method described in Examples is preferably 480 J/m$^2$ or more, more preferably 500 J/m$^2$ or more, still more preferably 510 J/m$^2$ or more. The IZOD impact strength at −30° C. is preferably as high as possible, but an upper limit therefor can be, for example, 630 J/m$^2$ or 600 J/m$^2$ from the viewpoint of the ease of production. Therefore, the IZOD impact strength at −30° C. measured in accordance with the method described in Examples can be, for example, 480 J/m$^2$ or more and 630 J/m$^2$ or less, 500 J/m$^2$ or more and 630 J/m$^2$ or less, 510 J/m$^2$ or more and 630 J/m$^2$ or less, 480 J/m$^2$ or more and 600 J/m$^2$ or less, 500 J/m$^2$ or more and 600 J/m$^2$ or less, or 510 J/m$^2$ or more and 600 J/m$^2$ or less.

Further, in a flame test measured in accordance with a method described in Examples, each of molded bodies having thicknesses of 2.0 mm and 3.0 mm can achieve V-0.

A molded body can be produced by molding a pellet of the polycarbonate resin composition obtained as described above through the utilization of, for example, an injection molding method, an injection compression molding method, an extrusion molding method, a blow molding method, a press molding method, a vacuum molding method, or an expansion molding method.

The molded body of the present invention is preferably an injection-molded body (including injection compression).

The molded body of the present invention is used for, for example, housings and various parts of OA equipment, household appliances, and electrical and electronic equipment such as a copying machine, a facsimile, a television, a radio, a tape recorder, a video cassette recorder, a personal computer, a printer, a telephone, an information terminal, a refrigerator, and a microwave oven.

EXAMPLES

The present invention is described in more detail by way of Examples. However, the present invention is by no means limited by these Examples.

Performance tests for resin compositions obtained in Examples were performed as described below.
(1) Total Light Transmittance: Transparency The total light transmittance of a flat plate having a thickness of 3 mm obtained by injection molding was measured in conformity with ISO 13468. A larger value for the total light transmittance means that the flat plate is more excellent in transparency. The value is preferably 85% or more.
(2) Haze: Transparency The haze of a flat plate having a thickness of 3 mm obtained by injection molding was measured in conformity with ISO 14782. A smaller value for the haze means that the flat plate is more excellent in transparency. The value is preferably 2.0 or less.
(3) IZOD Impact Strength (IZOD): Impact Resistance The IZOD impact strengths of a test piece having a thickness of ⅛ inch were measured at measurement temperatures of 23° C. and −30° C. in conformity with ASTM standard D-256, and were used as indicators of impact resistance. In particular, a test piece having an IZOD impact strength at −30° C. of 500 J/m² or more can be said to be excellent in impact resistance at low temperature.
(4) UL94 Flame Test: Flame Retardancy Two test pieces having thicknesses of 2.0 mm and 3.0 mm (each measuring 12.7 mm long by 12.7 mm wide) were subjected to a vertical flame test in conformity with an Underwriters Laboratory Subject 94 (UL94) flame test, and were each evaluated by being classified into any one of V-0, V-1, and V-2. The classification means that a test piece classified into V-0 is excellent in flame retardancy. In particular, such flame retardancy that even the test piece having a thickness of 2.0 mm is classified into V-0 is required.

Production Example 1

Production of Polycarbonate-Polydimethylsiloxane Copolymer 1 (PC-PDMS 1; Component (A-1))

(1. Oligomer Synthesizing Step)

Sodium dithionite was added in an amount of 2,000 ppm by mass with respect to bisphenol A (BPA) to be dissolved later to 5.6 mass % aqueous sodium hydroxide, and then BPA was dissolved in the mixture so that the concentration of BPA was 13.5 mass %. Thus, a solution of BPA in aqueous sodium hydroxide was prepared.

The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket.

The reaction liquid that had exited the tubular reactor was continuously introduced into a baffled vessel type reactor provided with a sweptback blade and having an internal volume of 40 L. The solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 329 g/L and a chloroformate group concentration of 0.74 mol/L.

(2. PC-PDMS 1 Producing Step)

Next, 15 L of the polycarbonate oligomer solution produced in the foregoing, 9.0 L of methylene chloride, 384 g of an allylphenol-terminal-modified polydimethylsiloxane (PDMS) having a number of repetitions (n) of a dimethylsiloxy unit of 40, and 8.8 mL of triethylamine were loaded into a 50-L vessel type reactor provided with a baffle board, a paddle type stirring blade, and a cooling jacket. 1,389 g of 6.4 mass % aqueous sodium hydroxide was added to the mixture under stirring to perform a reaction between the polycarbonate oligomer and the allylphenol-terminal-modified PDMS for 10 minutes.

A solution of p-t-butylphenol (PTBP) in methylene chloride (prepared by dissolving 137 g of PTBP in 2.0 L of methylene chloride) and a solution of BPA in aqueous sodium hydroxide (prepared by dissolving 1,012 g of BPA in an aqueous solution prepared by dissolving 577 g of NaOH and 2.0 g of sodium dithionite in 8.4 L of water) were added to the polymerization liquid to perform a polymerization reaction for 50 minutes.

10 L of methylene chloride was added to the resultant for dilution and then the mixture was stirred for 10 minutes. After that, the mixture was separated into an organic phase containing a PC-PDMS, and an aqueous phase containing excess amounts of BPA and NaOH, and then the organic phase was isolated.

The solution of the PC-PDMS in methylene chloride thus obtained was sequentially washed with a 0.03 mol/L aqueous NaOH and a 0.2 mol/L hydrochloric acid in amounts of 15 vol % each with respect to the solution. Next, the solution was repeatedly washed with pure water until an electric conductivity in an aqueous phase after the washing became 0.01 μS/m or less.

The solution of the PC-PDMS in methylene chloride obtained by the washing was concentrated and pulverized, and then the resultant flake was dried under reduced pressure at 120° C. Thus, a PC-PDMS 1 was obtained.

The resultant PC-PDMS 1 had a dimethylsiloxane residue amount determined by NMR measurement of 6.0 mass %, a viscosity number measured in conformity with ISO 1628-4 (1999) of 47.5, and a viscosity-average molecular weight (Mv) of about 17,700.

Production Example 2

Production of Polycarbonate-Polydimethylsiloxane Copolymer 2 (PC-PDMS 2; Component (A-1))

Production was performed in the same manner as in Production Example 1 except that the usage amount of the allylphenol terminal-modified PDMS having a number of repetitions (n) of a dimethylsiloxane unit of 40 was changed from 384 g to 224 g.

The resultant PC-PDMS 2 had a dimethylsiloxane residue amount of 3.5 mass %, a viscosity number measured in conformity with ISO 1628-4 (1999) of 47.6, and a viscosity-average molecular weight (Mv) of about 17,700.

Production Example 3

Production of Polycarbonate-Polydimethylsiloxane Copolymer 3 (PC-PDMS 3; Component (A-1))

Production was performed in the same manner as in Production Example 2 except that 224 g of an allylphenol terminal-modified PDMS having an average number of repetitions (n) of a dimethylsiloxane unit of 50 was used instead of 224 g of the allylphenol terminal-modified PDMS having a number of repetitions (n) of a dimethylsiloxane unit of 40.

The resultant PC-PDMS 3 had a dimethylsiloxane residue amount of 3.5 mass %, a viscosity number measured in conformity with ISO 1628-4 (1999) of 47.5, and a viscosity-average molecular weight (Mv) of about 17,700.

Production Example 4

Production of Polycarbonate-Polydimethylsiloxane Copolymer 4 (PC-PDMS 4; Component (A-2))

Production was performed in the same manner as in Production Example 3 except that 384 g of an allylphenol terminal-modified PDMS having an average number of repetitions (n) of a dimethylsiloxane unit of 90 was used instead of 224 g of the allylphenol terminal-modified PDMS having a number of repetitions (n) of a dimethylsiloxane unit of 50.

The resultant PC-PDMS 4 had a dimethylsiloxane residue amount of 6.0 mass %, a viscosity number measured in conformity with ISO 1628-4 (1999) of 47.5, and a viscosity-average molecular weight (Mv) of about 17,700.

Production Example 5

Production of Polycarbonate-Polydimethylsiloxane Copolymer 5 (PC-PDMS 5; Component (A-2))

Production was performed in the same manner as in Production Example 4 except that 224 g of an allylphenol terminal-modified PDMS having an average number of repetitions (n) of a dimethylsiloxane unit of 110 was used instead of 384 g of the allylphenol terminal-modified PDMS having a number of repetitions (n) of a dimethylsiloxane unit of 90.

The resultant PC-PDMS 5 had a dimethylsiloxane residue amount of 3.5 mass %, a viscosity number measured in conformity with ISO 1628-4 (1999) of 47.4, and a viscosity-average molecular weight (Mv) of about 17,700.

The physical properties of the PC-PDMS 1 to PC-PDMS 5 obtained in Production Examples 1 to 5 are summarized in Table 1 below.

TABLE 1

|  | Production Example 1 PC-PDMS 1 | Production Example 2 PC-PDMS 2 | Production Example 3 PC-PDMS 3 | Production Example 4 PC-PDMS 4 | Production Example 5 PC-PDMS 5 |
|---|---|---|---|---|---|
| Number of repetitions (n) in formula (II) | 40 | 40 | 50 | 90 | 110 |
| Allylphenol terminal-modified PDMS residue amount (mass %) | 6.0 | 3.5 | 3.5 | 6.0 | 3.5 |
| Viscosity number (mL/g) | 47.5 | 47.6 | 47.4 | 47.5 | 47.4 |
| Viscosity-average molecular weight (Mv) | About 17,700 | About 17,700 | About 17,700 | About 17,700 | About 17,700 |

Examples 1 to 8 and Comparative Examples 1 to 8

Respective components were blended at ratios (unit: part(s) by mass) shown in Table 2, and 0.10 part by mass of "IRGAFOS 168" (trade name, tris(2,4-di-t-butylphenyl) phosphite, manufactured by BASF) was mixed as an antioxidant with respect to 100 parts by mass of the component (A). After that, the mixture was melted and kneaded with a vented biaxial extruder "TEM-35B" (model name, manufactured by Toshiba Machine Co., Ltd.) at a resin temperature of 280° C. to provide a resin composition pellet.

The resultant pellet was injection-molded with an injection molding machine under the molding conditions of a cylinder temperature of 280° C. and a mold temperature of 80° C. to provide a test piece.

The resultant test piece was measured for its transparency, impact resistance, and flame retardancy in accordance with the above-mentioned method. The results are shown in Table 2.

TABLE 2

|  |  | Example | | | | | | | | Comparative Example | |
|---|---|---|---|---|---|---|---|---|---|---|---|
|  |  | 1 | 2 | 3 | 4 | 5 | 6 | 7 | 8 | 1 | 2 |
| Resin composition | (A) PC-PDMS 1*[1]: (A-1) | 90 | 80 | 70 |  |  | 90 | 80 | 80 | 100 |  |
|  | PC-PDMS 2*[2]: (A-1) |  |  |  | 80 |  |  |  |  |  |  |
|  | PC-PDMS 3*[3]: (A-1) |  |  |  |  | 90 |  |  |  |  |  |
|  | PC-PDMS 4*[4]: (A-2) | 10 | 20 | 30 | 20 | 10 |  | 20 | 15 |  | 100 |
|  | PC-PDMS 5*[5]: (A-2) |  |  |  |  |  | 10 |  |  |  |  |
|  | PC*[6]: (A-3) |  |  |  |  |  |  |  | 5 |  |  |
|  | Content (mass %) of repeating unit (n = 40) in formula (II) | 5.4 | 4.8 | 4.2 | 2.8 | — | 5.4 | 4.8 | 4.8 | 6.0 | — |
|  | Content (mass %) of repeating unit (n = 50) in formula (II) | — | — | — | — | 3.2 | — | — | — | — | — |
|  | Content (mass %) of repeating unit (n = 90) in formula (II) | 0.6 | 1.2 | 1.8 | 1.2 | 0.6 | — | 1.2 | 0.9 | — | 6.0 |
|  | Content (mass %) of repeating unit (n = 110) in formula (II) | — | — | — | — | — | 0.4 | — | — | — | — |
|  | Apparent number of repeating units (n) in formula (II) | 45 | 50 | 55 | 50 | 54 | 47 | 50 | 46 | 40 | 90 |

TABLE 2-continued

|  |  |  | | | | | | | | |
|---|---|---|---|---|---|---|---|---|---|---|
| | (B) | Potassium perfluorobutanesulfonate*[7] | 0.03 | 0.03 | 0.03 | 0.03 | 0.03 | 0.03 | 0.06 | 0.03 | — |
| Performance evaluation | (1) | Total light transmittance (%) | 88 | 87 | 86 | 87 | 87 | 86 | 87 | 87 | 89 | 71 |
| | (2) | Haze | 0.9 | 1.0 | 1.5 | 1.1 | 1.0 | 1.5 | 1.0 | 1.0 | 0.6 | 10 |
| | (3) | IZOD impact strength (23° C.) J/m | 750 | 780 | 770 | 760 | 760 | 740 | 780 | 780 | 770 | 750 |
| | | IZOD impact strength (−30° C.) J/m | 520 | 540 | 550 | 520 | 530 | 530 | 540 | 530 | 510 | 630 |
| | (4) | UL94 flame test (thickness: 2.0 mm) | V-0 | V-0 | V-0 | V-0 | V-0 | V-0 | V-0 | V-0 | V-2 | V-2 |
| | | UL94 flame test (thickness: 3.0 mm) | V-0 | V-0 | V-0 | V-0 | V-0 | V-0 | V-0 | V-0 | V-2 | V-2 |

| | | | Comparative Example | | | | | |
|---|---|---|---|---|---|---|---|---|
| | | | 3 | 4 | 5 | 6 | 7 | 8 |
| Resin composition | (A) | PC-PDMS 1*[1]: (A-1) | 100 | | | | 50 | 80 |
| | | PC-PDMS 2*[2]: (A-1) | | | | 100 | | |
| | | PC-PDMS 3*[3]: (A-1) | | 100 | | | | |
| | | PC-PDMS 4*[4]: (A-2) | | | 100 | | 50 | 20 |
| | | PC-PDMS 5*[5]: (A-2) | | | | | | |
| | | PC*[6]: (A-3) | | | | | | |
| | | Content (mass %) of repeating unit (n = 40) in formula (II) | 6.0 | — | — | 3.5 | 3.0 | 4.8 |
| | | Content (mass %) of repeating unit (n = 50) in formula (II) | — | 3.5 | — | — | — | — |
| | | Content (mass %) of repeating unit (n = 90) in formula (II) | — | — | 6.0 | — | 3.0 | 1.2 |
| | | Content (mass %) of repeating unit (n = 110) in formula (II) | — | — | — | — | — | — |
| | | Apparent number of repeating units (n) in formula (II) | 40 | 50 | 90 | 40 | 65 | 50 |
| | (B) | Potassium perfluorobutanesulfonate*[7] | 0.03 | 0.03 | 0.03 | 0.03 | 0.03 | 0.10 |
| Performance evaluation | (1) | Total light transmittance (%) | 89 | 88 | 70 | 89 | 83 | 85 |
| | (2) | Haze | 0.6 | 0.7 | 10 | 0.5 | 2.8 | 2.8 |
| | (3) | IZOD impact strength (23° C.) J/m | 770 | 770 | 750 | 800 | 740 | 770 |
| | | IZOD impact strength (−30° C.) J/m | 510 | 520 | 630 | 200 | 560 | 530 |
| | (4) | UL94 flame test (thickness: 2.0 mm) | V-1 | V-1 | V-0 | Vout*[8] | V-0 | V-1 |
| | | UL94 flame test (thickness: 3.0 mm) | V-0 | V-0 | V-0 | V-2 | V-0 | V-0 |

(Description of Annotations in Table 2)
*[1]PC-PDMS 1 obtained in Production Example 1, component (A-1)
*[2]PC-PDMS 2 obtained in Production Example 2, component (A-1)
*[3]PC-PDMS 3 obtained in Production Example 3, component (A-1)
*[4]PC-PDMS 4 obtained in Production Example 4, component (A-2)
*[5]PC-PDMS 5 obtained in Production Example 5, component (A-2)
*[6]"TARFLON FN1700A" (trade name, manufactured by Idemitsu Kosan Co., Ltd., bisphenol A-type aromatic polycarbonate having p-t-butylphenol as a terminal group, viscosity-average molecular weight: 17,700), component (A-3)
*[7]"EFTOP KFBS" (trade name, manufactured by Mitsubishi Materials Electronic Chemicals Co., Ltd., potassium perfluorobutanesulfonate)
*[8]V-2 evaluation was not achieved.

As can be seen from Table 2, the polycarbonate resin composition according to one embodiment of the present invention is excellent in all of transparency, impact resistance, and flame retardancy. In particular, the composition is found to be excellent in impact resistance at a temperature as low as −30° C. as well.

On the other hand, as can be seen from Comparative Examples 1 to 6, a resin composition that does not use the component (A-1) and the component (A-2) in combination at a specific ratio cannot satisfy all of the transparency, the impact resistance, and the flame retardancy.

When the content of the repeating unit represented by the general formula (II) in the component (A-2) exceeded 2.8 mass % like Comparative Example 7, the transparency significantly reduced. In addition, when the blending amount of the component (B) exceeded 0.08 part by mass with respect to 100 parts by mass of the component (A) like Comparative Example 8, the transparency was not necessarily satisfactory and the flame retardancy of the test piece having a thickness of 2 mm was insufficient.

INDUSTRIAL APPLICABILITY

The polycarbonate resin composition of the present invention is excellent in transparency, impact resistance, and flame retardancy, and hence can be suitably used in fields in which these characteristics are required such as electrical and electronic equipment, information and communication equipment, household electrical appliances, OA equipment, an automobile field, and a building material field.

The invention claimed is:
1. A polycarbonate resin composition, comprising:
(A) 100 parts by mass of a resin mixture comprising
(A-1) a polycarbonate-polyorganosiloxane copolymer comprising, in a main chain thereof, a repeating unit represented by formula (I) and a repeating unit represented by formula (II), wherein n=30 to 55 and a content of the repeating unit represented by the formula (II) in the copolymer (A-1) ranges from 2.5 mass % to 6.0 mass %, and (A-2) a polycarbonate-polyoranosiloxane copolymer comprising, in a main chain thereof, a repeating unit represented by the formula (I) and a repeating unit represented by the formula (II), wherein n=80 to 120 and a content of the repeating unit represented by the formula (II) in the copolymer (A-2) ranges from 0.3 mass % to 2.1 mass %; and (B) 0.01 to 0.08 part by mass of at least one component selected from the group consisting of an alkali metal salt of an organic sulfonic acid and an alkali earth metal salt of an organic sulfonic acid:

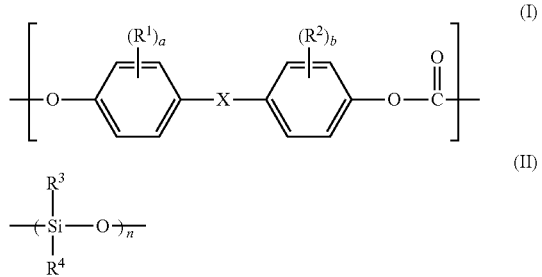

wherein:

$R^1$ and $R^2$ each independently represent a halogen atom, an alkyl group comprising 1 to 6 carbon atoms, or an alkoxy group comprising 1 to 6 carbon atoms, X represents a single bond, an alkylidene group comprising 1 to 8 carbon atoms, an alkylidene group comprising 2 to 8 carbon atoms, a cycloalkylene group comprising 5 to 15 carbon atoms, a cycloalkylidene group comprising 5 to 15 carbon atoms, a fluorenediyl group, an arylalkyl group comprising 7 to 15 carbon atoms, an arylalkylidene group comprising 7 to 15 carbon atoms, —S—, —SO—, —SO$_2$—, —O—, or —CO—, a and b each independently represent an integer of 0 to 4; and $R^3$ and $R^4$ each independently represent a hydrogen atom, a halogen atom, an alkyl group comprising 1 to 6 carbon atoms, an alkoxy group comprising 1 to 6 carbon atoms, or an aryl group comprising 6 to 12 carbon atoms, and n represents an average number of repetitions.

2. The polycarbonate resin composition according to claim 1, wherein the component (B) comprises at least one component selected from the group consisting of an alkali metal salt of a perfluoroalkanesulfonic acid and an alkali earth metal salt of a perfluoroalkanesulfonic acid.

3. The polycarbonate resin composition according to claim 1, wherein a molded body of the polycarbonate resin composition having a thickness of 3 mm has a total light transmittance measured based on ISO 13468 of 85% or more.

4. The polycarbonate resin composition according to claim 1, wherein a molded body of the polycarbonate resin composition having a thickness of 2 mm is evaluated as V-0 by a UL94 flame test.

5. The polycarbonate resin composition according to claim 1, wherein the polycarbonate resin composition is free of a bromine-based flame retardant.

6. A molded body, obtained by a process comprising molding the polycarbonate resin composition of claim 1.

7. The polycarbonate resin composition according to claim 1, wherein the amount of (A-1) ranges from 40 to 95 pads by mass and the amount of (A-2) as being 5 to 60 parts by mass.

8. The polycarbonate resin compositing according to claim 1, wherein the amount of (A-1) ranges from 45 to 93 parts by mass and the amount of (A-2) as being 5 to 60 parts by mass.

9. The polycarbonate resin compositing according to claim 1, wherein the amount of (A-1) ranges from 50 to 91 parts by mass and the amount of (A-2) as being 5 to 60 parts by mass.

10. The polycarbonate resin composition according to claim 1, wherein the amount of (A-1) ranges from 60 to 95 parts by mass and the amount of (A-2) as being 5 to 60 parts by mass.

11. The polycarbonate resin composition according to claim 1, wherein the amount of (A-1) ranges from 66 to 93 parts by mass and the amount of (A-2) as being 7 to 34 parts by mass.

12. The polycarbonate resin composition according to claim 1, wherein the amount of (A-1) ranges from 66 to 91 parts by mass and the amount of (A-2) as being 9 to 34 parts by mass.

* * * * *